June 12, 1934.  C. R. ELBERT  1,962,489
AUTOMATIC TOOL DRIVING MACHINE
Filed May 26, 1933   2 Sheets-Sheet 1
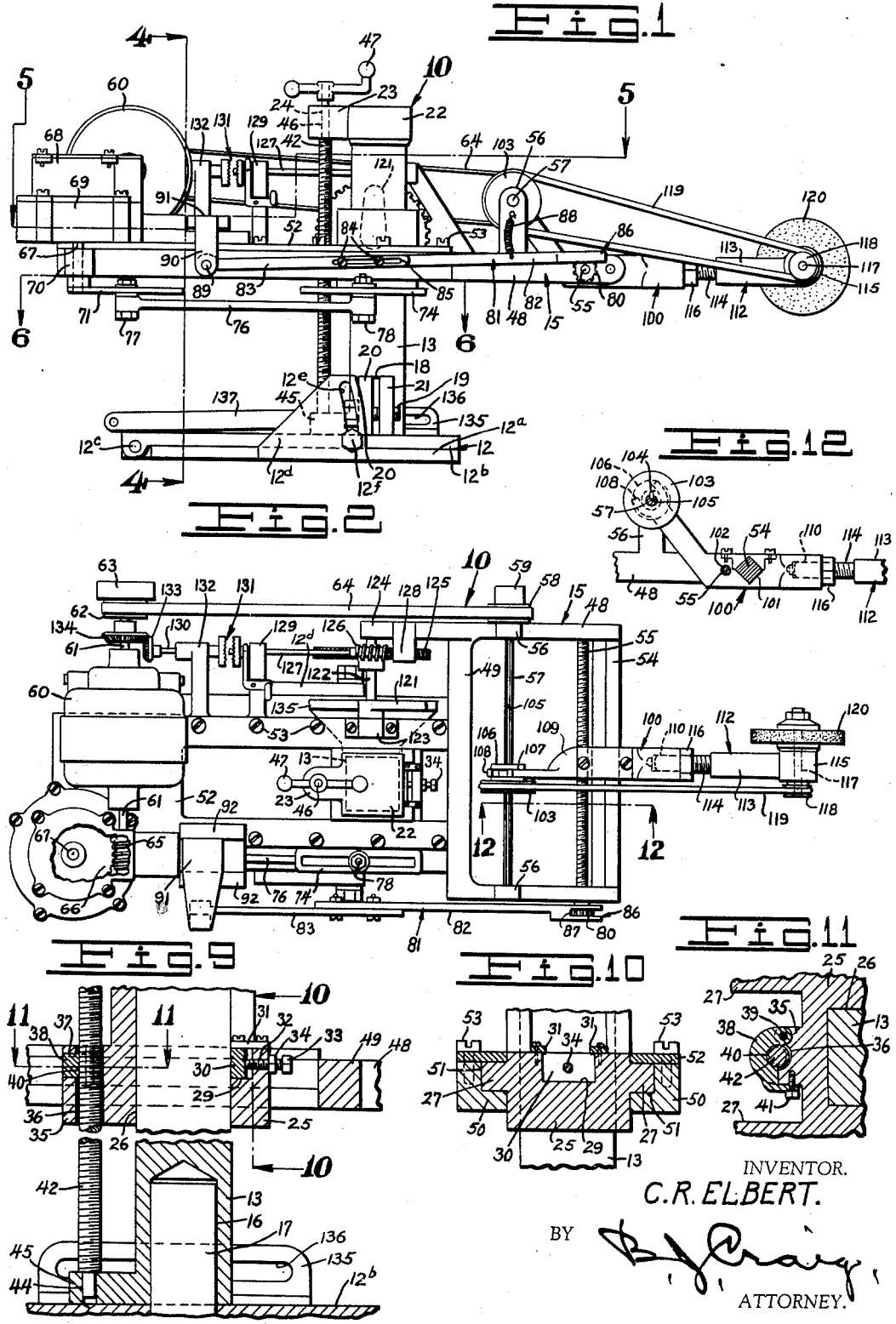
INVENTOR.
C. R. ELBERT.
BY
ATTORNEY.

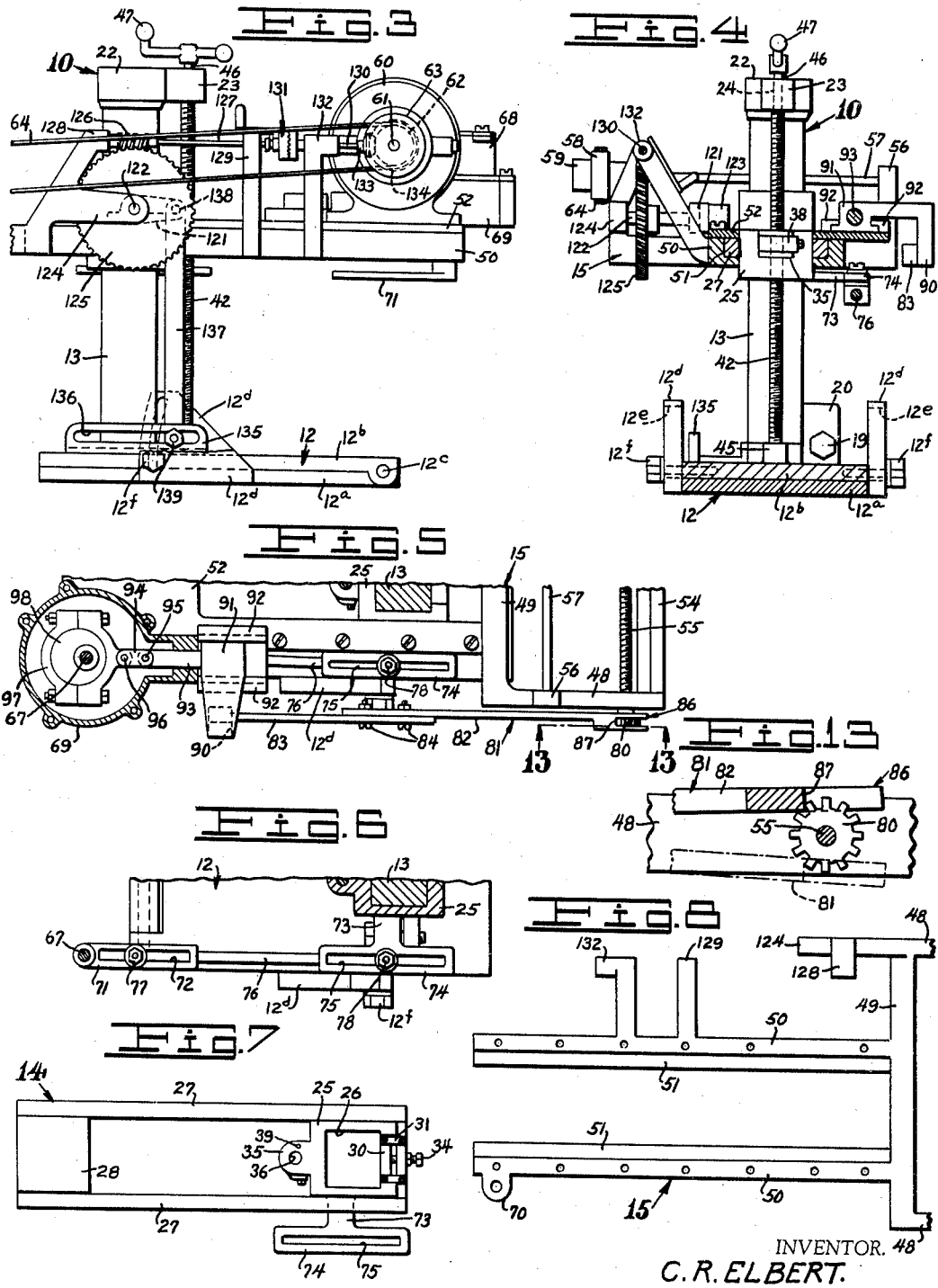

Patented June 12, 1934

1,962,489

UNITED STATES PATENT OFFICE 1,962,489

AUTOMATIC TOOL DRIVING MACHINE

Clifford R. Elbert, Los Angeles, Calif., assignor of one-half to Axel E. Nygreen, Los Angeles, Calif.

Application May 26, 1933, Serial No. 672,923

8 Claims. (Cl. 51—166)

This invention relates to improvements in automatic tool driving machines.

The general object of the invention is to provide an improved tool driving machine wherein novel means is provided to control the movement of the tool in different directions.

Another object of the invention is to provide a tool driving machine including novel means for supporting and driving a tool.

A further object of the invention is to provide an improved portable tool driving machine which is particularly adapted for grinding.

Other objects and the advantages of the invention will be apparent from the following description taken in connection with the accompanying drawings wherein:

Fig. 1 is a side elevation of my improved tool driving machine;

Fig. 2 is a top plan view of the device shown in Fig. 1;

Fig. 3 is a fragmentary view similar to Fig. 1 showing the opposite side of the machine;

Fig. 4 is a section taken on line 4—4 of Fig. 1;

Fig. 5 is a fragmentary section taken on line 5—5 of Fig. 1;

Fig. 6 is a fragmentary section taken on line 6—6 of Fig. 1;

Fig. 7 is a top plan view of the frame member of the machine;

Fig. 8 is a fragmentary top plan view of the carriage member of the machine;

Fig. 9 is a fragmentary enlarged central vertical section through the machine;

Fig. 10 is a section taken on line 10—10 of Fig. 9;

Fig. 11 is a section taken on line 11—11 of Fig. 9;

Fig. 12 is a section taken on line 12—12 of Fig. 2; and,

Fig. 13 is an enlarged section taken on line 13—13 of Fig. 5.

Referring to the drawings by reference characters I have indicated my improved tool driving machine generally at 10. As shown the device 10 comprises a base 12 having a post 13 thereon on which is mounted a frame 14 (see Fig. 7) which supports a carriage member 15 (see Fig. 8). The base 12 comprises a lower plate 12$^a$ having a top plate 12$^b$ pivotally secured thereto adjacent one end as indicated at 12$^c$. Extending upward from the sides of the base plate 12$^a$ I provide flanges 12$^d$ having arcuate apertures 12$^e$ therein in which bolts 12$^f$ are threaded in the plate 12$^b$ so that the plate 12$^b$ may be secured in different adjusted angular positions.

The post 13 is square in cross section and adjacent its lower end includes an annular recess 16 in which a stud shaft 17 secured to the base is positioned (see Fig. 9). Adjacent the recess 16 the post 13 is slotted as indicated at 18 in Fig. 1. For clamping the post 13 to the stud shaft 17 I provide a bolt 19 which is positioned in a suitable aperture of a boss 20 on one side of the slot 18 and engages the threads of a threaded aperture of a boss 21 on the opposite side of the slot. Thus it will be seen that when the bolt 19 is unscrewed the post 13 is loosened from the stud shaft 17 and may be swung about the axis of the stud shaft and when the bolt 19 is tightened the post 13 is firmly clamped to the stud shaft. The post 13 further includes a head portion 22 having a boss 23 extending therefrom and which includes a vertical aperture 24.

The frame 14 includes a body portion 25 having a square aperture 26 therethrough in which the post 13 is positioned (see Fig. 7). Extending from the body 25 on each side thereof I provide rail members 27 which adjacent the end opposite the body portion 25 are shown as connected by a bridge portion 28. Adjacent one side of the aperture 26 and opening through the upper face of the body portion I provide a recess 29 (see Fig. 9) in which a block 30 is positioned.

The block 30 is shown as retained in the recess 29 by gibs 31 positioned adjacent each side of the recess 29 and overlaying the bar 30. Opening through the rear face of the body portion 25 and communicating with the recess 29 I provide a threaded aperture 32 in which a bolt 33 having a lock nut 34 is positioned. When the bolt 33 is loosened the frame 14 is free to slide vertically on the post 13 and when the bolt 33 is tightened it engages the bar 30 and moves it into engagement with the post 13 thereby rigidly clamping the frame to the post.

Extending from the face of the body portion 25 opposite the bolt 33 I provide a boss 35 which has a vertical aperture 36 therethrough (see Figs. 9 and 11). The boss 35 includes a recess 37 in which a member 38 is positioned and which is pivotally secured to the boss as at 39. The member 38 is provided with a semi-cylindrical groove 40 which is threaded. The member 38 is secured in an operative position by a bolt 41.

For raising and lowering the frame 14 I provide a threaded rod 42 which is positioned in the aperture 36 of the boss 35 and engages the threads of the member 38. At its lower end the rod 42 includes a plane reduced portion 43 which is positioned in an aperture 44 of a boss 45 integral with the post 13 (see Fig. 9), and adjacent its upper end the rod 42 includes a plane reduced portion 46 which is positioned in the aperture 26 of the boss 23. The portion 46 of the rod extends above the boss 23 where it is provided with an operating handle 47. Thus it will be apparent that when the member 38 is in an operative position and the rod 42 is rotated the frame 14 may be either raised or lowered.

The carriage 15 at one end includes a forked portion which comprises spaced side bars 48 connected by a back portion 49. Extending from the back portion 49 in a direction opposite to that of the side bars I provide a pair of spaced channel bars 50 having rabbeted channelways 51 therein which open through the upper and inner faces of the bars (see Figs. 8 and 10). The rails 27 of the frame 14 are positioned in the rabbets 51 of the carriage 15 and a gib plate 52 is positioned on the carriage over the rails 27 and is secured to the carriage by bolts 53 thereby retaining the carriage in an operative position on the frame 14.

Adjacent the front of the forked portion I provide a bar 54 which is shown as square in cross section and which extends from one side bar 48 to the other and is rigidly secured thereto. Spaced at the rear of the bar 54 I provide a threaded rod 55 which is rotatably supported by the side bars 48.

Adjacent the rear of the forked portion I provide on each of the side bars 48 an upstanding bearing member 56 in which a drive shaft 57 is rotatably mounted. Secured to the drive shaft 57 adjacent the outside of the bearing 56 I provide a pair of pulleys 58 and 59 of different diameters. For driving the shaft 57 I provide an electric motor 60 which is mounted on the gib plate 52. Adjacent one end of the armature shaft 61 of the motor I provide a pair of pulleys 62 and 63 of different diameters. As shown in Fig. 2 a belt 64 engages the motor pulley 62 and the pulley 58 of the drive shaft 57. Thus when the motor 60 operates the drive shaft 57 will be rotated. To change the speed of the drive shaft 57 the belt 64 may be positioned to engage the motor pulley 63 and the pulley 59 on the shaft 57.

The end of the armature shaft 61 of the motor 60 at the end opposite the pulleys 62 and 63 has a worm pinion 65 secured thereto which meshes with a worm gear 66 mounted on a vertical drive shaft 67. The pinion 65 and gear 66 are shown as arranged in a housing 68 which is mounted on a cam housing 69 on the gib plate 52. The shaft 67 extends down through the housing 69 and is shown as journaled in a bearing member 70 on the carriage 15.

Secured to the shaft 67 below the bearing 70 I provide an arm 71 having an elongated aperture 72 therein (see Fig. 6). Integrally connected to the body 25 of the frame 14 by an arm 73 I provide a bracket 74 which has an elongated aperture 75 therein. The arm 73 projects from one side of the body portion of the frame 14 below the adjacent channel bar of the carriage 15 as clearly shown in Fig. 4. One end of a bar member 76 is pivotally secured to the arm 71 by a bolt and nut connecting means as indicated at 78.

From the foregoing it will be apparent that when the motor 60 is operating it will rotate the shaft 67 through the medium of the gear 66 and the pinion 65 and as the shaft 67 rotates the arm 71 will be swung about the axis of the shaft. As the arm 71 is thus operated it pulls and pushes on the bar 76 thereby reciprocating the carriage 15 on the frame 14. For rotating the threaded shaft 55 I secure thereto a square toothed wheel 80 (see Fig. 13) which is adapted to be rotated by an operating bar indicated generally at 81. As shown the operating bar 81 is made in two longitudinal sections 82 and 83 securely connected by bolts and nuts 84 positioned in elongated slots 85 (Fig. 1) provided in the sections 82 and 83. The end of the bar section 82 adjacent the wheel 80 includes a forked portion 86 having a rear operating face 87 (see Fig. 13).

When the forked portion 86 is positioned above the shaft 55 as shown in Fig. 13 and the bar 81 is moved towards the wheel 80 the lower edge of the operating face 87 engages one tooth of the wheel 80 and rotates the wheel a predetermined distance which in turn rotates the shaft 55. When the bar 81 moves in a direction away from the wheel 80 the bar rides over the wheel and does not rotate it.

To change the direction of rotation of the wheel 80 the forked portion 86 is positioned below the shaft 55 as indicated by the broken lines in Fig. 13. When the forked portion 86 is positioned above the shaft 55 the weight of the bar 81 retains the device in engagement with the wheel 80 and when the forked portion 86 is positioned below the wheel 55 the device is retained in engagement with the wheel 80 by a coiled spring 88 (Fig. 1) which has one end thereof connected to the bar portion 82 and the opposite end is anchored to a portion of the carriage.

The end of the section 83 of the bar 81 opposite the forked portion 86 is pivotally connected as at 89 to a downwardly extending boss 90 of a slide block 91. The slide block 91 is shown as mounted on the gib plate 52 and slidably mounted in rail members 92 (see Figs. 2, 4 and 5). As shown in Fig. 5 the slide block 91 includes a rod 93 which extends into the cam housing 69 where one end of a link 94 is pivotally connected thereto as at 95. The opposite end of the link 94 is pivotally connected as at 96 to a cam yoke 97 which is mounted on an eccentric cam member 98 secured to the shaft 67.

From the foregoing it will be apparent that when the shaft 67 is rotated by the motor 60, as previously described, the cam 98 will be rotated and will, through the medium of its associated yoke member 97 and line 94, reciprocate the slide block 91 which in turn will reciprocate the bar member 81 thereby rotating the wheel 80 as previously described.

Slidably mounted on the bar 54 I provide a carrier member 100 which includes a square aperture 101 in which the bar 54 is positioned and a threaded aperture 102 in which the threaded shaft 55 is positioned (see Fig. 12). Mounted on the drive shaft 57 I provide a pulley 103. The pulley 103 is slidable along the drive shaft by a key 104 which is positioned in a key slot 105 provided in the drive shaft. The pulley 103 further includes a hub 106 having an annular groove 107 therein in which the forked end 108 of an arm 109 integral with the carrier 100 is positioned. The carrier 100 is provided with a threaded aperture 110, the axis of which, is at right angles to the axis of the bar 54.

In the accompanying drawings, I have indicated at 112 one type of working head which is adapted to be mounted in the carrier 100. As shown the working head 112 includes a body portion 113 having at one end a reduced threaded stem 114 and at the opposite end a bearing portion 115. The threaded stem 114 of the working head is positioned in the threaded aperture 110 of the carrier and is locked in the correct position by a lock nut 116. Journaled in the bearing portion 115 of the working head I provide a shaft 117 the axis of which is at right angles to the axis of the threaded stem 114.

Secured to the shaft 117 adjacent one side of the bearing portion 115 I provide a pulley 118 which is adapted to be driven by a belt 119 from the pulley 103 on the drive shaft 57. Secured to the shaft 117 adjacent the opposite side of the bearing portion I provide a tool member 120 which is shown as an emery wheel. Thus it will be apparent that when the pulley 103 is rotated the belt 119 will rotate the pulley 118 which will rotate the shaft 117 which in turn will rotate the tool 120. When the threaded shaft 55 is rotated by the wheel 80 as previously described the carrier 100 will be moved from one side of the forked portion of the carriage to the other. Although I have shown the tool 120 as an emery wheel it will be understood that a disc saw, or other rotating tool may be used instead of the emery wheel with equal success.

In operation the operator turns the post 13 about the axis of the stud shaft 17 until the frame 14 and carriage 15 are in the desired position and then clamps the post 13 in the adjusted position by the clamping bolt 19. The operator then raises or lowers the frame and carriage to the desired position by rotating the rod 42 in the correct direction and then clamps the frame 14 to the post 13 by means of the block 30 and the bolt 34.

The motor 60 is then started to drive the shaft 57 which in turn rotates the tool 120 as previously described. At the same time the carriage 15 is reciprocated on the frame 14 as previously described and the carrier 100 will travel from one side of the machine towards the opposite side as previously described.

When the carrier member 100 reaches the limit of its travel towards one side the operator places the operating end 86 of the bar 81 on the opposite side of the shaft 55 to reverse the direction of rotation of the shaft 55 as previously described, whereupon, the carrier 100 travels in the opposite direction.

From the foregoing it will be apparent that when the motor 60 is operating the tool 120 is carried across the object upon which it is working in two directions, each at right angles to the other. If it is desired to only have the carriage 15 reciprocate and not have the carrier 100 travel the operator removes the operating bar 81. If it is desired to have only the carrier 100 move and not the carriage 15 the operator removes the bar 76.

For reciprocating the frame 14 and the carriage 15 vertically on the post 13 I provide an arm 121 which is mounted on a shaft 122 supported adjacent one end in a bearing 123 on the gib plate 52 and adjacent the opposite end in a bearing 124 integral with the portion 49 of the carriage. For rotating the shaft 122 I secure thereto a worm gear 125 which meshes with a worm pinion 126 on a shaft 127. The shaft 127 is shown as supported at one end in a bearing portion 128 which is integral with the bearing portion 124 and adjacent the opposite end in a bearing member 129 integral with the carriage 15. The shaft 127 is shown as adapted to be driven from a shaft 130 through the medium of a clutch mechanism 131 which may be of any desired type. The shaft 130 is shown as journaled in a bearing member 132 which is integral with the carriage 15. The shaft 130 has secured thereto a bevel gear 133 which meshes with a bevel gear 134 on the armature shaft 61 of the motor 60.

Integral with the post 13 I provide a bracket 135 having an elongated aperture 136 therein (see Fig. 3). When it is desired to reciprocate the frame and carriage vertically on the post 13 the operator removes the bar 76 and pivotally connects one end of a bar 137 to the arm 121 as indicated at 138 in Fig. 3. The opposite end of the bar 137 is pivotally secured to the bracket 135 by a bolt and nut connecting means as indicated at 139, the bolt being positioned in the aperture 136. The operator then removes the bolt 41 and swings the member 38 out of engagement with the threaded rod 42 and then backs off the bolt 34 to disengage the clamping block 30 from the post 13.

The motor 60 is then started which will drive the tool 120 and cause the carrier 100 to travel as previously described. At the same time the operator engages the clutch unit 131 whereupon the arm 121 is rotated which thereby through the medium of the bar 137 causes the frame 14 and the carriage 15 to reciprocate vertically on the post 13.

From the foregoing description it will be apparent that I have provided a novel tool driving machine which is simple in construction and highly efficient in use.

Having thus described my invention, I claim:

1. In a tool driving machine, a base, a vertical post on said base, a frame member movable on said post, releasable means to clamp said frame to said post, a carriage member supported by said frame and movable relative thereto at right angles to said post, an electric motor on said carriage, said motor including an armature shaft, a vertical shaft adjacent said motor, gear reduction means to drive said vertical shaft from said motor armature shaft, an arm on said vertical shaft, a bracket on said frame, and a rod pivotally secured at one end to said arm and pivotally secured at the opposite end to said bracket, whereby rotation of said arm about the axis of said vertical shaft reciprocates said carriage.

2. In a tool driving machine, a support, a base pivoted on said support, a frame, means to support said frame on said base, a carriage on said frame, a motor on said carriage, a drive shaft operated by said motor, means for reciprocating said carriage, a cross rod mounted on said carriage, a tool carrier mounted on said cross rod, a tool mounted on said carrier, a rotatably threaded rod on said carriage, said carrier having means thereon engaging said threaded rod, means including a slide driven by said motor to rotate said threaded rod whereby said carrier is moved along the rod, a driving member connected to said carrier and splined to said drive shaft to move as the carrier moves along the threaded member and means to drive said tool from said drive shaft.

3. In a tool driving machine, a base, a post on said base, a frame member movable on said post, a carriage member supported by said frame and movable relative thereto, said carriage including side members, an electric motor on said carriage including an armature shaft, a supporting bar supported by said side members, a threaded shaft rotatably supported by said side members, a carrier member mounted on said supporting bar and movable thereon, said carrier including a threaded aperture, said threaded shaft being positioned in said threaded aperture, a drive shaft adjacent said motor, means to drive said drive shaft from said motor armature shaft, an arm on said drive shaft, a bracket on said frame, a rod pivotally secured to said arm and to said bracket, a sliding block on said carriage, a cam member on said drive shaft, means whereby rotation of said cam reciprocates said block and means operated by said slide block to rotate said threaded rod.

4. In a tool driving machine, a base, a post on said base, a frame member movable on said post, a carriage member supported by said frame and movable relative thereto, said carriage including side members, an electric motor on said carriage including an armature shaft, a supporting bar supported by said side members, a threaded shaft rotatably supported by said side members, a carrier member mounted on said supporting bar and movable thereon, said carrier including a threaded aperture, said threaded shaft being positioned in said threaded aperture, a drive shaft adjacent said motor, means to drive said drive shaft from said motor armature shaft, an arm on said drive shaft, a bracket on said frame, a rod pivotally secured to said arm and to said bracket, a sliding block on said carriage, a cam member on said drive shaft, means whereby rotation of said cam reciprocates said slide block, an operating bar pivotally secured at one end to said slide block, the opposite end of said operating bar including a working face, a toothed wheel secured to said threaded shaft, said working face being adapted to engage a tooth of said wheel and revolve said wheel when said operating bar moves in one direction.

5. In a tool driving machine, a base, a vertical post on said base, a frame member on said post, said frame being movable axially on said post, a carriage member supported by said frame and movable relative thereto at right angles to said post, a fork-like portion adjacent one end of said carriage including side members, an electric motor on said carriage including an armature shaft, a supporting bar supported by said side members and extending transversely of said forked portion, a threaded shaft rotatably supported by said side members and extending transversely on said forked portion, a carrier member mounted on said supporting bar and movable longitudinally thereon, said carrier including a threaded aperture, said threaded shaft being positioned in said threaded aperture, a vertical shaft adjacent said motor, gear reduction means to drive said vertical shaft from said motor armature shaft, an arm on said vertical shaft, a bracket on said frame, a rod pivotally secured at one end to said arm and pivotally secured at the opposite end to said bracket, a sliding block on said carriage, a cam member on said vertical shaft, means whereby rotation of said cam reciprocates said slide block, an operating bar, said operating bar at one end being pivotally secured to a portion of said slide block, the opposite end of said operating bar including a fork-like portion including a working face at the rear of said forked portion, a square toothed wheel secured to said threaded shaft, said forked portion of said operating bar being adapted to straddle said wheel and said working face being adapted to engage a tooth of said wheel and revolve said wheel when said operating bar moves in one direction.

6. In a tool driving machine, a base, a vertical post on said base, said post being polygonal in cross section, a frame member movable on said post, releasable means to clamp said frame to said post, a carriage member supported by said frame and movable relative thereto at right angles to said post, means to move said frame along said post, means to cause the operation of said moving means to be inoperative to move said frame, a fork-like portion adjacent one end of said carriage including side members, a drive shaft supported by said side members and extending transversely of said forked portion, means to drive said drive shaft, a polygonal bar supported by said side members and extending transversely of said forked portion, a threaded shaft rotatably supported by said side members and extending transversely of said forked portion, a carrier member mounted on said polygonal bar and movable longitudinally thereon, said carrier including a threaded aperture, said threaded shaft being positioned in said threaded aperture, a slide block on said carriage, an operating bar, said operating bar at one end being pivotally secured to a portion of said slide block, the opposite end of said operating bar including a fork-like portion including a working face at the rear of said forked portion, a square toothed wheel secured to said threaded shaft, said forked portion of said operating bar being adapted to straddle said wheel and said working face being adapted to engage a tooth of said wheel and revolve said wheel when said operating bar moves in one direction, and means to reciprocate said operating bar.

7. In a tool driving machine, a base, a vertical stud on said base, a post, said post being polygonal in cross section, a recess in said post, said stud being positioned in said recess, means to releasably clamp said post to said stud, a frame member movable axially on said post, releasable means to clamp said frame member to said post, a carriage member supported by said frame and movable relative thereto at right angles to said post, threaded means to move said frame axially along said post, means to render the operation of said threaded means inoperative to move said frame, a fork-like portion adjacent one end of said carriage including side members, a drive shaft supported by said side members and extending transversely of said forked portion, an electric motor on said carriage including an armature shaft, means to drive said drive shaft from said armature shaft, a polygonal bar supported by said side members and extending transversely of said forked portion, a threaded shaft rotatably supported by said side members and extending transversely of said forked portion, a carrier member mounted on said polygonal bar and movable longitudinally thereon, said carrier including a threaded aperture, said threaded shaft being positioned in said threaded aperture, a tool head removably mounted on said carrier, a rotatable shaft supported by said tool head and having a pulley thereon, a pulley on said drive shaft, means to drive said tool head pulley from said drive shaft pulley, said drive shaft pulley being rotatable with said drive shaft and movable axially on said drive shaft, said carrier including means engaging coacting means on said drive shaft pulley to move said drive shaft pulley with the carrier, a vertical shaft adjacent said motor, gear reduction means to drive said vertical shaft, an arm on said vertical shaft, a bracket on said frame, and a rod pivotally secured at one end to said arm and at the opposite end pivotally secured to said bracket.

8. In a tool driving machine, a base, a vertical post on said base, a frame member on said post, a carriage member supported by said frame and movable relative thereto at right angles to said post, threaded means to move said frame axially along said post, a fork-like portion adjacent one end of said carriage including side members, a drive shaft supported by said side members and extending transversely of said forked portion, an electric motor on said carriage including an armature shaft, means to drive said drive shaft from said armature shaft, a supporting bar supported by said side members and extending transversely of said forked portion, a threaded shaft rotatably supported by said side members and extending transversely of said forked portion, a carrier member mounted on said supporting bar and movable longitudinally thereon, said carrier having a threaded aperture, a tool head mounted on said carrier, a rotatable shaft supported by said tool head and having a pulley thereon, a pulley on said drive shaft, means to drive said tool head pulley from said drive shaft pulley, means whereby said drive shaft pulley is rotatable with said drive shaft and is movable axially on said shaft, means on said carrier engaging coacting means on said drive shaft pulley to move said drive shaft pulley along with the carrier, a vertical shaft adjacent said motor, means to drive said vertical shaft from said motor armature shaft, an arm on said vertical shaft, a bracket on said frame, and a rod pivotally secured at one end to said arm and at the opposite end pivotally secured to said bracket whereby rotation of said arm about the axis of said vertical shaft reciprocates said carriage.

CLIFFORD R. ELBERT.